US008542836B2

(12) United States Patent
Pochop, Jr.

(10) Patent No.: US 8,542,836 B2
(45) Date of Patent: Sep. 24, 2013

(54) SYSTEM, APPARATUS AND METHODS FOR HIGHLY SCALABLE CONTINUOUS ROAMING WITHIN A WIRELESS NETWORK

(75) Inventor: Jeffrey L. Pochop, Jr., Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 209 days.

(21) Appl. No.: 12/957,997

(22) Filed: Dec. 1, 2010

(65) Prior Publication Data

US 2012/0144462 A1     Jun. 7, 2012

(51) Int. Cl.
*H04K 1/00* (2006.01)
*H04L 9/32* (2006.01)

(52) U.S. Cl.
USPC .................................. 380/270; 726/2; 726/3

(58) Field of Classification Search
USPC ................. 380/247, 255, 270, 277; 713/168, 713/170–171; 726/2–7, 14–15
See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | De Couasnon et al. |
| 4,176,316 A | 11/1979 | DeRosa et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah et al. |
| 4,635,221 A | 1/1987 | Kerr |
| 4,639,914 A | 1/1987 | Winters |
| 4,644,523 A | 2/1987 | Horwitz |

(Continued)

FOREIGN PATENT DOCUMENTS

EP   1 542 409 A1   6/2005
WO   WO 94/03986   2/1994

(Continued)

OTHER PUBLICATIONS

Aesmpors and Winters "A Wireless Network for Wide-Band Indoor Communications," IEEE Journal on selected Areas in Communications, vol. SAC-5, No. 5, Jun. 1987, pp. 796-804.

(Continued)

*Primary Examiner* — Hosuk Song
(74) *Attorney, Agent, or Firm* — Cooley LLP

(57) ABSTRACT

In one embodiment, an apparatus includes a first access point within a wireless network. The first access point is configured to identify a communication device within a radio frequency (RF) range of the first access point. The first access point is also configured to request a session key associated with the communication device from a first network controller associated with the first access point in response to the communication device being identified. The first access point is further configured to receive the session key associated with the communication device from a second network controller associated with a second access point having an RF range partially overlapping the RF range of the first access point.

20 Claims, 6 Drawing Sheets

(56) References Cited

U.S. PATENT DOCUMENTS

| | | |
|---|---|---|
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | McRae et al. |
| 4,894,842 A | 1/1990 | Broekhoven et al. |
| 4,901,307 A | 2/1990 | Gilhousen et al. |
| 4,933,952 A | 6/1990 | Albrieux et al. |
| 4,933,953 A | 6/1990 | Yagi |
| 4,995,053 A | 2/1991 | Simpson et al. |
| 5,008,899 A | 4/1991 | Yamamoto |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,142,550 A | 8/1992 | Tymes |
| 5,157,687 A | 10/1992 | Tymes |
| 5,187,575 A | 2/1993 | Lim |
| 5,231,633 A | 7/1993 | Hluchy et al. |
| 5,280,498 A | 1/1994 | Tymes et al. |
| 5,285,494 A | 2/1994 | Sprecher et al. |
| 5,329,531 A | 7/1994 | Diepstraten |
| 5,418,812 A | 5/1995 | Reyes et al. |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,491,644 A | 2/1996 | Pickering et al. |
| 5,517,495 A | 5/1996 | Lund et al. |
| 5,519,762 A | 5/1996 | Bartlett |
| 5,528,621 A | 6/1996 | Heiman et al. |
| 5,561,841 A | 10/1996 | Markus |
| 5,568,513 A | 10/1996 | Croft et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,844,900 A | 12/1998 | Hong et al. |
| 5,875,179 A | 2/1999 | Tikalsky |
| 5,896,561 A | 4/1999 | Schrader et al. |
| 5,915,214 A | 6/1999 | Reece et al. |
| 5,920,821 A | 7/1999 | Seazholtz et al. |
| 5,933,607 A | 8/1999 | Tate et al. |
| 5,949,988 A | 9/1999 | Feisullin et al. |
| 5,953,669 A | 9/1999 | Stratis et al. |
| 5,960,335 A | 9/1999 | Umemoto et al. |
| 5,982,779 A | 11/1999 | Krishnakumar et al. |
| 5,987,062 A | 11/1999 | Engwer et al. |
| 5,987,328 A | 11/1999 | Ephremides et al. |
| 6,005,853 A | 12/1999 | Wang et al. |
| 6,011,784 A | 1/2000 | Brown |
| 6,041,358 A | 3/2000 | Huang et al. |
| 6,078,568 A | 6/2000 | Wright |
| 6,088,591 A | 7/2000 | Trompower et al. |
| 6,119,009 A | 9/2000 | Baranger et al. |
| 6,160,804 A | 12/2000 | Ahmed et al. |
| 6,199,032 B1 | 3/2001 | Anderson |
| 6,208,841 B1 | 3/2001 | Wallace et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,256,300 B1 | 7/2001 | Ahmed et al. |
| 6,256,334 B1 | 7/2001 | Adachi |
| 6,285,662 B1 | 9/2001 | Watanabe et al. |
| 6,336,035 B1 | 1/2002 | Somoza et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,404,772 B1 | 6/2002 | Beach et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,580,700 B1 | 6/2003 | Pinard et al. |
| 6,587,680 B1 | 7/2003 | Ala-Laurila et al. |
| 6,661,787 B1 | 12/2003 | O'Connell et al. |
| 6,747,961 B1 | 6/2004 | Ahmed et al. |
| 6,760,324 B1 | 7/2004 | Scott et al. |
| 6,839,338 B1 | 1/2005 | Amara et al. |
| 6,839,388 B2 | 1/2005 | Vaidyanathan |
| 6,847,620 B1 | 1/2005 | Meier |
| 7,020,773 B1 | 3/2006 | Otway et al. |
| 7,024,394 B1 | 4/2006 | Ashour et al. |
| 7,062,566 B2 | 6/2006 | Amara et al. |
| 7,155,518 B2 | 12/2006 | Forslow |
| 7,221,927 B2 | 5/2007 | Kolar et al. |
| 7,350,077 B2 | 3/2008 | Meier et al. |
| 7,505,434 B1 | 3/2009 | Backes |
| 7,509,096 B2 | 3/2009 | Palm et al. |
| 7,529,925 B2 | 5/2009 | Harkins |
| 7,577,453 B2 | 8/2009 | Matta |
| 7,603,710 B2 * | 10/2009 | Harvey et al. .................. 726/23 |
| 7,724,704 B2 | 5/2010 | Simons et al. |
| 7,844,298 B2 | 11/2010 | Riley |
| 7,856,659 B2 * | 12/2010 | Keeler et al. ..................... 726/7 |
| 8,140,845 B2 * | 3/2012 | Buddhikot et al. ........... 713/168 |
| 8,161,278 B2 | 4/2012 | Harkins |
| 2002/0069278 A1 | 6/2002 | Forslow |
| 2002/0191572 A1 | 12/2002 | Weinstein et al. |
| 2003/0014646 A1 | 1/2003 | Buddhikot et al. |
| 2003/0193910 A1 | 10/2003 | Shoaib et al. |
| 2004/0047320 A1 | 3/2004 | Eglin |
| 2004/0095932 A1 | 5/2004 | Astarabadi et al. |
| 2004/0120370 A1 | 6/2004 | Lupo |
| 2004/0221042 A1 | 11/2004 | Meier |
| 2004/0236702 A1 | 11/2004 | Fink et al. |
| 2005/0030929 A1 | 2/2005 | Swier et al. |
| 2005/0078644 A1 | 4/2005 | Tsai et al. |
| 2005/0097618 A1 | 5/2005 | Arling et al. |
| 2005/0122977 A1 | 6/2005 | Lieberman |
| 2005/0163078 A1 | 7/2005 | Oba et al. |
| 2005/0180345 A1 | 8/2005 | Meier |
| 2005/0180358 A1 | 8/2005 | Kolar et al. |
| 2006/0187878 A1 | 8/2006 | Calhoun et al. |
| 2006/0248331 A1 | 11/2006 | Harkins |
| 2007/0189222 A1 | 8/2007 | Kolar et al. |
| 2008/0102815 A1 | 5/2008 | Sengupta et al. |
| 2008/0107077 A1 | 5/2008 | Murphy |
| 2009/0073905 A1 | 3/2009 | Gast |
| 2009/0198999 A1 | 8/2009 | Harkins |
| 2010/0261475 A1 | 10/2010 | Kim et al. |
| 2012/0204031 A1 | 8/2012 | Harkins |

FOREIGN PATENT DOCUMENTS

| | | |
|---|---|---|
| WO | WO 99/11003 | 3/1999 |
| WO | WO 03/085544 A1 | 10/2003 |
| WO | WO 2004/095192 A2 | 11/2004 |
| WO | WO 2004/095880 A1 | 11/2004 |
| WO | WO 2010/130133 | 11/2010 |

OTHER PUBLICATIONS

Aesmpors and Winters, "System Applications for Wireless Indoor Communications" IEEE Communications Magazine, vol. 25, No. 8, Aug. 1987, pp. 11-20.

Bing and Subramanian, "A New Multiaccess Technique for Multimedia Wireless LANs" IEEE Global Telecommunications Conference, Nov. 3-8, 1997, pp. 1318-1322.

Durgin, et al., "Measurements and Models for Radio Path Loss and Penetration Loss in and Amand Homes and Trees at 5.85 GHz", IEEE Transactions on Communications, vol. 46, No. 11, Nov. 1988, pp. 1484-1496.

Freret et al., Applications of Spread-Spectrum Radio to Wireless Terminal Communications, Conf. Record, Nat'l Telecom. Conf., Nov. 30-Dec. 4, IEEE, 1980, pp. 69.7.1-69.7.4.

Fortune et al., "Wise Design of Indoor Wireless Systems: Practical Composition and Optimization", IEEE Computational Science and Engineering, p. 58-68 (1995).

Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.

Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.

Kim et al., "Radio Propagation Measurements and Prediction Using Three-Dimensional Ray tracing in Urban Enviornments at 908 Mhz and 1.9 GHz", IEEE Transactions on Vehicular Technology, vol. 48, No. 3, May 1999.

Kleinrock and School, "Packet Switching in Radio channels: New Conflict-Free Multiple Accesds Schemes for a Small Number of Data Users", Conference record 1977 ICC vol. 2 of 3, Jun. 12-15 Chicago Illinois (1977).

LAN/MAN Standards Committee of the IEEE Computer Society, Part 13:Wireless LAN Medium Access Control (MAC) and Physical Layer (PHY) Specifications-Higher Speed Physical Layer Extension in the 2.4 GHz BAnd, IEEE Std. 802.11b (1999).

Okamoto and Xu, IEEE, "Multimedia Communications over Wireless LANs via the SWL Protocol" Proceedings of the 13th Annual Hawaii International Conference on System Sciences, pp. 54-63 (1997).

Panjwani et al., "Interactive Comparison of Coverage Regions for Wireless Communication in Multifloored Indoor Environments", IEEE Journal on Selected Areas in Communications, vol. 14, No. 3, Apr. 1996.

Peream and Martinez, "Technology Developments for Low-Cost Residental Alarm Systems", Proceedings 1977 Carnahan Conference on Crime Countermeasures, Apr. 6-8, pp. 45-50 (1977).

Piazzi et al., "Achievable Accuracy of Site-Specific Path-Loss Predictions in Residential Environments", IEEE Transactions on Vehicular Technology, vol. 48, No. 3, May, 1999.

Seidel et al., "Sire-Specific Propagations Prediction for Wireless In-Building Personal Communications System Design", IEEE Transactions on Vehicular Technology, vol. 43, No. 4, Nov. 1994.

Skidmore et al., "Interactive Coverage Region and System Design Simulation for Wireless Communication Systems in Multi-floored Indoor Environments, SMT Plus" IEEE ICUPC '96 Proceedings (1996).

Ulimo et al., "Wireless Propagation in Buildings: A Statistic Scattering Approach", IEEE Transactions on Vehicular Technology, vol. 48, No. 3, May 1999.

Law, A., "New Service Discovery Protocol," Internet Citation [Online] XP002292473 Retrieved from the Internet <URL: http://sern.ucalgary.ca+18lawa/seng60921/arch/sdp.htm> [retrieved Aug. 12, 2004] (15 pages).

Sangheon Pack et al., "Fast-handoff support in IEEE 802.11 wireless networks," IEEE Communications Surveys, IEEE, NY, NY, vol. 9, No. 1, Jan. 1, 2007 (pp. 2-12) ISSN: 1553-877X.

Aerohive Blog, posted by Devin Akin, Cooperative Control: Part 3, [Online] Retrieved from the Internet: <URL:http://blog.aerohive.com/blog/7p=71> Mar. 1, 2010 (3 pages).

Wikipedia, Wireless LAN, 2 definitions for wireless LAN roaming, [Online] [retrieved Oct. 4, 2010] Retrieved from the Internet <URL:http://en.wikipedia.org/wiki/Wireless_LAN> (1 page).

U.S. Appl. No. 12/603,391, filed Oct. 21, 2009.

U.S. Appl. No. 13/447,656, filed Apr. 16, 2012.

Office Action for U.S. Appl. No. 11/784,307, mailed Sep. 22, 2009.

Final Office Action for U.S. Appl. No. 11/784,307, mailed Jun. 14, 2010.

Non-Final Office Action for U.S. Appl. No. 11/377,859, mailed Jan. 8, 2008.

Final Office Action for U.S. Appl. No. 11/377,859, mailed Aug. 27, 2008.

Office Action for U.S. Appl. No. 12/401,073, mailed Aug. 23, 2010.

Final Office Action for U.S. Appl. No. 12/401,073, mailed Apr. 1, 2011.

Office Action for U.S. Appl. No. 12/401,073, mailed Sep. 20, 2011.

Office Action for U.S. Appl. No. 11/970,484, mailed Nov. 24, 2010.

Final Office Action for U.S. Appl. No. 11/970,484, mailed Jul. 22, 2011.

Office Action for U.S. Appl. No. 11/970,484, mailed Jun. 20, 2012.

Extended Search Report for European Application No. 11188566.1, mailed Jan. 30, 2012.

International Search Report and Written Opinion for PCT/US05/004702, mailed Aug. 10, 2006.

International Search Report and Written Opinion for PCT/US2008/010708, mailed May 18, 2009.

* cited by examiner

SYSTEM, APPARATUS AND METHODS FOR HIGHLY SCALABLE CONTINUOUS ROAMING WITHIN A WIRELESS NETWORK

BACKGROUND

Some embodiments described herein relate generally to wireless networks, and, in particular, to systems and methods for providing seamless roaming within a wireless network.

Some known wireless networks, such as a wireless local area network (LAN), include autonomous access points that cannot communicate with each other within the network. In such a network, interruptions in connectivity to the network can occur as a mobile communication device moves out of range of one access point and into the range of another access point. Some other known wireless networks can include communication between access points, but can be limited as to the number of communication devices and access points that can be maintained within the network. For example, in some wireless networks, copies of communication device information used for fast roaming across control domains are stored at all access points in the network. Such a network can be limited by the amount of memory available in the controllers as well as the network control interconnect bandwidth used to maintain communication device authentication keys and other state information current across all of the access points. For example, some known wireless local area networks are limited to about 10,000 access points and about 100,000 communication devices.

Accordingly, a need exists for a system and method that provides improved roaming across multiple control domains within a wireless network that supports large numbers of communication devices.

SUMMARY

In one embodiment, an apparatus includes a first access point within a wireless network. The first access point is configured to identify a communication device within a radio frequency (RF) range of the first access point. The first access point is also configured to request a session key associated with the communication device from a first network controller associated with the first access point in response to the communication device being identified. The first access point is further configured to receive the session key associated with the communication device from a second network controller associated with a second access point having an RF range partially overlapping the RF range of the first access point.

DETAILED DESCRIPTION

Figure 1:
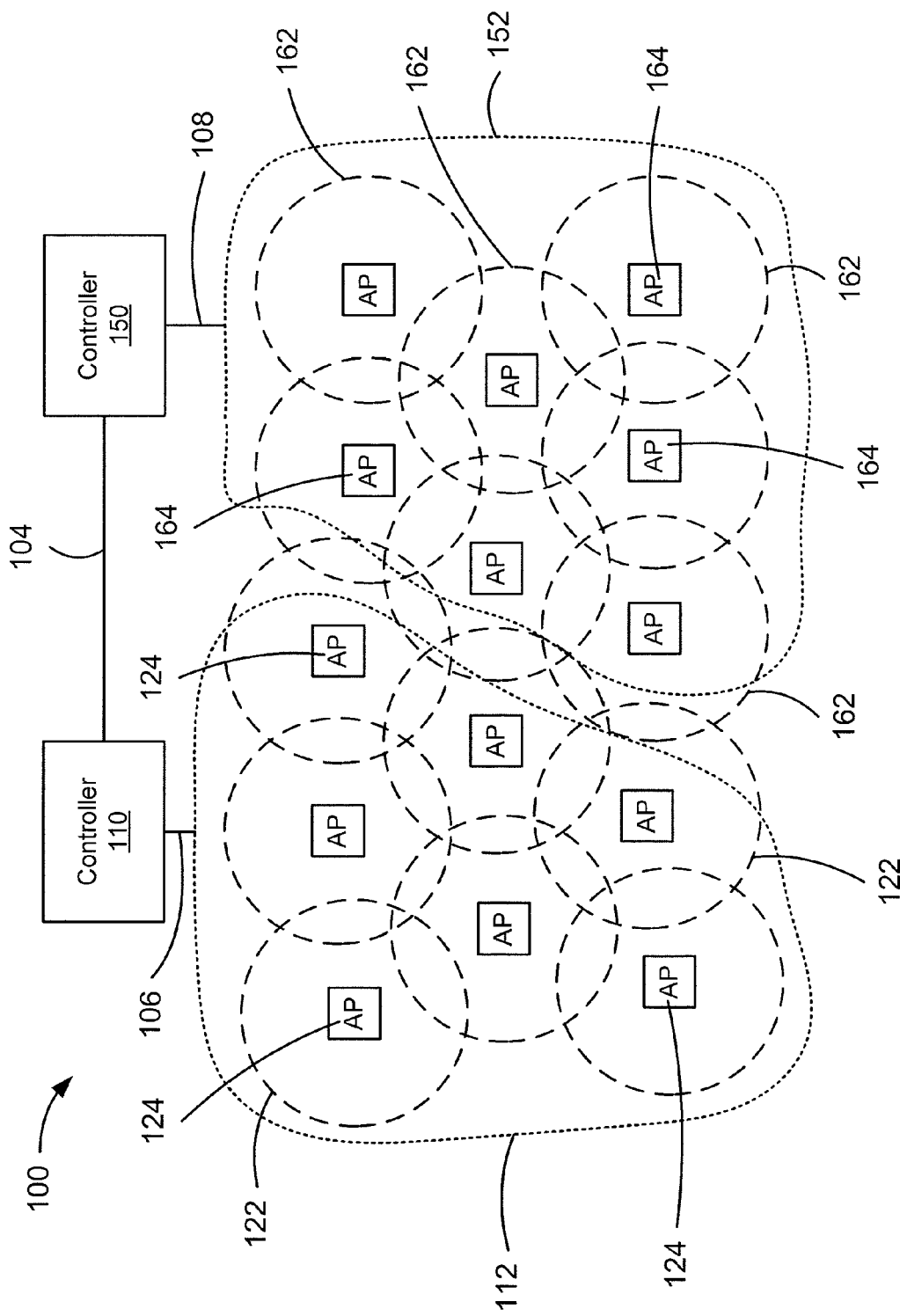
FIG. 1 is a schematic illustration of a wireless local area network, according to an embodiment.

Systems, apparatus and methods are described herein to provide fast roaming within a wireless network that can support large numbers of communication devices. The communication devices can be, for example, mobile electronic devices, personal computers, laptop computers, cell phones, and/or handheld computers. The systems, apparatus and methods described herein can include, for example, multiple controllers that each can control and manage multiple access points within a separate control domain of a wireless network. The access points can each use a radio frequency signal to identify communication devices within a connectivity range to the access point and to register the communication device for future roam events within its range. The registration of communication devices can be performed across multiple control domains and access points within the network to provide continuous connectivity to the network as the communication device roams within and between control domains of the network.

In some embodiments, as a communication device enters within a RF range of an access point of a first control domain, the communication device can connect to the network (e.g., authenticate and register to the network) via that access point and a first controller can define a session key for that communication device. The session key can be used to identify that communication device registered to the network. The first controller can store the communication device session key, along with other information associated with the session key, such as, for example, a unique identifier for the communication device, authentication keys, state information and/or preconfigured security policies. The first controller can also provide the session key to all of the access points within the first control domain. As a communication device roams into a RF range of an access point within a second control domain of the network, the first controller can provide the session key associated with that communication device to that access point within the second control domain. For example, in some embodiments, when the access point in the second control domain detects the communication device has entered into its RF range, that access point can request from a second controller associated with the second control domain, the session key for the detected communication device. The second controller can then request the session key from the first controller and provide it to the access point. Thus, the session key for that communication device is only provided to an access point of another control domain when the communication device roams into the RF range of that access point. Such a system can limit the amount of information required to propagate across multiple control domains within the network, and allows for scalability to large networks supporting large numbers of communication devices.

In some embodiments, an apparatus includes a first access point within a wireless network. The first access point is configured to identify a communication device within a radio frequency (RF) range of the first access point. The first access point is also configured to request a session key associated with the communication device from a first network controller associated with the first access point in response to the communication device being identified. The first access point is further configured to receive the session key associated with the communication device from a second network controller associated with a second access point having an RF range partially overlapping the RF range of the first access point.

In some embodiments, a non-transitory processor-readable medium storing code representing instructions to cause a processor to broadcast an identification packet within a radio frequency (RF) range of a first access point of a network. In response to the broadcast of the identification packet, a signal is received having a unique identifier of a device. In response to the signal, a session key associated with the device is requested from a first network controller associated with the first access point. The session key is received from a second network controller via the first network controller. The second network controller is associated with a second access point that connects the device to the network when the device is within an RF range of the second access point.

In some embodiments, a system includes a first network controller configured to manage a first access point within a network. The first network controller is configured to maintain a session key for a device such that the first access point provides the device with connectivity to the network when the device is at a first location and a second location. The first location being within a radio frequency (RF) range of the first access point but not a second access point. The system also includes a second network controller is configured to manage the second access point within the network. The second network controller is configured to request, from the first network controller, the session key for the device in response to the device moving from the first location to the second location within the RF range of the first access point. The second location also being within an RF range of the second access point.

As used herein, "associated with" can mean, for example, included in, physically located with, a part of, and/or operates or functions as a part of. For example, a controller associated with a first control domain of a network can be said to be included in, physically located with or a part of the first control domain of the network. A controller associated with a first control domain of a network can also be said to operate or function as a part of the first control domain of the network. Additionally, "associated with" can mean, for example, references, identifies, characterizes, describes, and/or sent from. For example, an controller associated with a control domain can be a controller that identifies, references and/or relates to the control domain.

As used in this specification, the singular forms "a," "an" and "the" include plural referents unless the context clearly dictates otherwise. Thus, for example, the term "a network" is intended to mean a single network or a combination of networks.

FIG. 1 is a schematic illustration of a wireless network according to an embodiment. The wireless network 100 (also referred to herein as "network") can be, for example, a wireless local area network ("WLAN"), a wireless wide area network ("WWAN"), a cellular network and/or a network based on IEEE (Institute of Electrical and Electronic Engineers) 802.11 standards. The network 100 can include a first controller 110 that can control and manage multiple access points 124 within a first control domain 112, and a second controller 150 that can control and manage multiple access points 164 within a second control domain 152.

Although FIG. 1 illustrates two controllers 110, 150, two control domains 112, 152, and a number of access points within each control domain 112, 152, it should be understood that FIG. 1 is merely an example configuration of the wireless network 100. In alternative embodiments, wireless network 100 can include any number of controllers, control domains and access points. In addition, the network 100 or portions of the network 100 can also be referred to as a system. For example, the first controller 110, second controller 150, access points 124 and access points 164 can also collectively be referred to as a system.

The first controller 110 can be operatively coupled to the second controller 150 via a wired connection 104. The access points 124 can each be operatively coupled to the first controller 110 via a wired connection 106, and the access points 164 can each be operatively coupled to the second controller 150 via a wired connection 108. The access points 124 and the access points 164 can provide connectivity within the wireless network 100 to multiple communication devices (not shown in FIG. 1) as described in more detail below. Each access point 124 and each access point 164 includes a radio frequency (RF) transceiver 132 (see e.g., FIG. 3). The RF transceiver 132 defines a RF visibility range 122, 162 for that access point 124, 164, respectively.

The access points 124 and access points 164 can each detect when a communication device has entered into its RF visibility range (122, 162). For example, in some embodiments, an access point 124, 164 can identify a communication device by periodically sending a beacon signal within its RF range. In some embodiments, the beacon signal includes broadcasting an identifier packet within its RF range. In response to the broadcast packet, the access point 124, 164, can receive a signal representing a unique identifier from a communication device(s) within its RF range. In some embodiments, the access point 124, 164 can, for example, send 10 beacon signals every second (i.e., every $1/10^{th}$ of a second).

A communication device as described herein can be, for example, any of a variety of electronic devices that can be operatively coupled to and communicate with wireless network 100. A communication device can be, for example, a personal computer, a laptop computer, a personal digital assistant (PDA), a cellular telephone, a portable/mobile internet device and/or some other electronic communication device, and that can communicate with a wireless network, such as, network 100. A communication device can move or roam within the first control domain 112 and access the network 100 via access points 124, and/or can roam within the second control domain 152 and access the network 100 via access points 164, substantially without connection interruption. Thus, the network 100 can provide fast roaming between multiple control domains (e.g., 112, 152) substantially without losing connection to the network 100 as described in more detail below.

Figure 2:
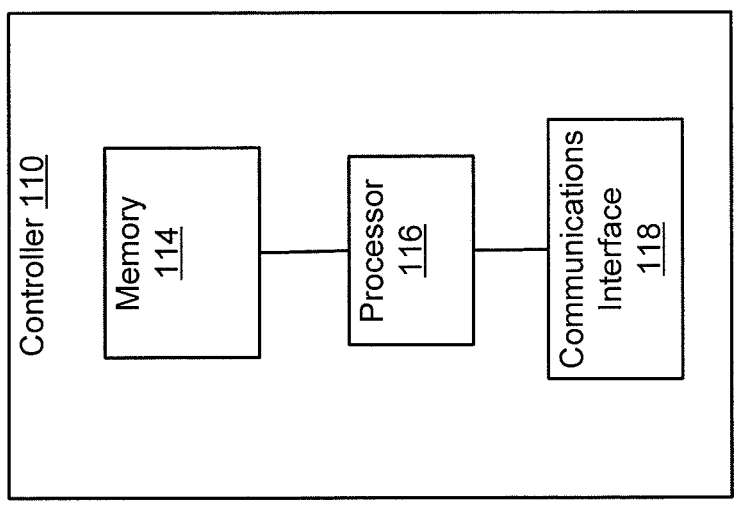
FIG. 2 is a schematic illustration of a controller, according to an embodiment.

As shown in FIG. 2, the controller 110 can include a processor 114, a memory 116, and a communications interface 118. Although not shown, it should be understood that the second processor 150 can be configured the same as, or similar to, and perform the same or similar functions, as controller 110.

Processor 114 can be operatively coupled to memory 116 and communications interface 118. Controller 110 can communicate with other controllers (e.g., controller 150) and access points 124 via communications interface 118. Communications interface 118 can be one or more wired and/or wireless data connections, such as connections conforming to one or more known information exchange standards, such as wired Ethernet, wireless 802.11x ("Wi-Fi"), high-speed packet access ("HSPA"), worldwide interoperability for microwave access ("WiMAX"), wireless local area network ("WLAN"), Ultra-wideband ("UWB"), Universal Serial Bus ("USB"), Bluetooth®, infrared, Code Division Multiple Access ("CDMA"), Time Division Multiple Access ("TDMA"), Global Systems for Mobile Communications ("GSM"), Long Term Evolution ("LTE"), broadband, fiber optics, telephony, and/or the like.

Memory 116 can be, for example, a read-only memory ("ROM"); a random-access memory ("RAM") such as, for example, a magnetic disk drive, and/or solid-state RAM such as static RAM ("SRAM") or dynamic RAM ("DRAM"); and/or FLASH memory or a solid-data disk ("SSD"). In some embodiments, a memory can be a combination of memories. For example, a memory can include a DRAM cache coupled to a magnetic disk drive and an SSD.

The processor 114 can be any of a variety of processors. Such processors can be implemented, for example, as hardware modules such as embedded microprocessors, microprocessors as part of a computer system, Application-Specific Integrated Circuits ("ASICs"), and Programmable Logic Devices ("PLDs"). Some such processors can have multiple instruction executing units or cores. Such processors can also be implemented as one or more software modules in programming languages such as, for example, Java™, C++, C, assembly, a hardware description language, or any other suitable programming language. A processor according to some embodiments includes media and computer code (also can be referred to as code) specially designed and constructed for the specific purpose or purposes. In some embodiments, the processor 114 can support standard HTML, and software languages such as, for example, JavaScript, JavaScript Object Notation (JSON), Asynchronous JavaScript (AJAX).

In some embodiments, a processor can be, for example, a single physical processor such as a general-purpose processor, an ASIC, a PLD, or a FPGA having a single processing core or a group of processing cores. In some embodiments, a processor can be a group or cluster of processors such as a group of physical processors operatively coupled to a shared clock or synchronization signal, a shared memory, a shared memory bus, and/or a shared data bus. In other words, a processor can be a group of processors in a multi-processor computing device. In some embodiments, a processor can be a group of distributed processors (e.g., computing devices with one or more physical processors) operatively coupled one to another via a communications network. Thus, a processor can be a group of distributed processors in communication one with another via a communications network. In some embodiments, a processor can be a combination of such processors. For example, a processor can be a group of distributed computing devices, where each computing device includes a group of physical processors sharing a memory bus and each physical processor includes a group of processing cores.

Figure 3:
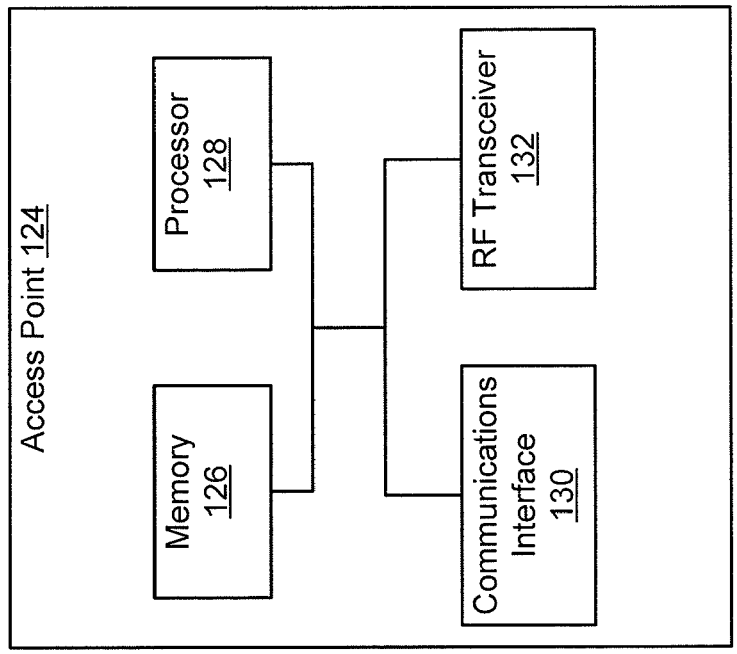
FIG. 3 is a schematic illustration of an access point, according to an embodiment.

FIG. 3 is a schematic illustration of an access point 124. Each access point 124 can include a processor 128, a memory 126, and a communications interface 130, each of which can be configured the same as or similar to controller 110 described above. Access point 124 can communicate with other access points 124 in control domain 112 and with controller 110 via communication interface 130.

As described above, each access point 124 also includes a radio frequency (RF) transceiver 132 that defines a RF visibility range 122 (also referred to herein as "RF range") (see FIG. 1) for that access point 124. Each access point 124 can detect when a communication device has roamed into its RF range 122. For example, as described above, each access point 124 can identify a communication device by periodically sending a beacon signal within its RF range and receiving a response when a communication device is within the RF range of that access point 124. Although not shown, it should be understood that each access point 164 can be configured the same as, or similar to, and perform the same or similar functions as access points 124.

As described above, the controller 110 can control and manage the connection activity at multiple access points 124 within control domain 112. Similarly, controller 150 can control and manage the connection activity at multiple access points 164 within control domain 152. The controller 110 can store information associated with each of the communication devices that are connected to the network 100 via an access point 124, and controller 150 can store information associated with each of the communication devices that are connected to the network 100 via an access point 164. For example, as a communication device enters within a RF range 122 of an access point 124 within control domain 112, the communication device can connect to the network 100 (e.g., register and authenticate to the network) via the access point 124, and the first controller 110 can define a session key for that communication device. The session key can be used to identify the communication device as it roams within the network 100. The first controller 100 can store the session key, along with other information associated with that communication device, such as, for example, a unique identifier, authentication keys, state information and/or preconfigured security policies. Once the session key has been defined for that communication device, the first controller 110 can provide the session key to all of the access points 124 within the first control domain 112. The access points 124 can use the session key to connect and maintain a network session between the communication device and the network 100 as the communication device enters and exits the RF range of the various access point 124 within the first control domain 112.

For example, as the communication device moves or roams within the network 100, the communication device can cross into RF ranges of other access points 124 of the control domain 112. As other access points 124 detect the communication device, because they already have the session key for that communication device, the point of access to the network 100 for the communication device can seamlessly change between access points 124. The point at which the communication device's connection to the network 100 changes between a first access point 124 and a second access point 124 can be determined based on the RF signal strength between the communication device and the particular access points 124. For example, if a communication device is connected to the network 100 via a first access point 124, as the communication device moves away from the first access point 124 and closer to a second access point 124, the signal strength to the second access point 124 will eventually become greater than the signal strength the first access point 124. At a predetermined threshold for the signal strength, the communication device can request connection to the network 100 via the second access point 124. The communication device will eventually drop its connection via the first access point 124, for example, simultaneously, or after the connection via the second access point 124.

In some embodiments, for example, the RF beacon signal sent by an access point 124 and the associated response to the beacon signal that is sent to the access point 124 identifying a communication device can be used in the signal strength calculation by the communication device to make a determination to switch from one access point 124 to another access point 124. In some embodiments, the RF beacon signal and the associated response are not used in the signal strength calculation by the communication device and instead other handshaking signals and responses can be used.

The communication device can also roam between the first control domain 112 and the second control domain 152 without loss of connectivity to the network 100. As the communication device roams into a RF range of an access point 164 of second control domain 152, that access point 164 can detect the communication device and request the session key from the second controller 150. The second controller 150 can then request the session key for that communication device from the first controller 110, and in turn provide the session key to the access point 164. Thus, the session key is only provided to access point 164 of second control domain 152 as needed when the communication device roams into the RF range of the access point 164. In some embodiments, the session key is provided to that access point 164 of second control domain 152 that requested the session key for the communication device, and not the other access points 164 of the second control domain 152. In other embodiments, the session key can be provided to all access points 164 of the second control domain 152 via second controller 150. The point at which the communication device's connection to the network changes between an access point 124 and access point 164 is described in more detail below with reference to FIG. 4.

Figure 4:
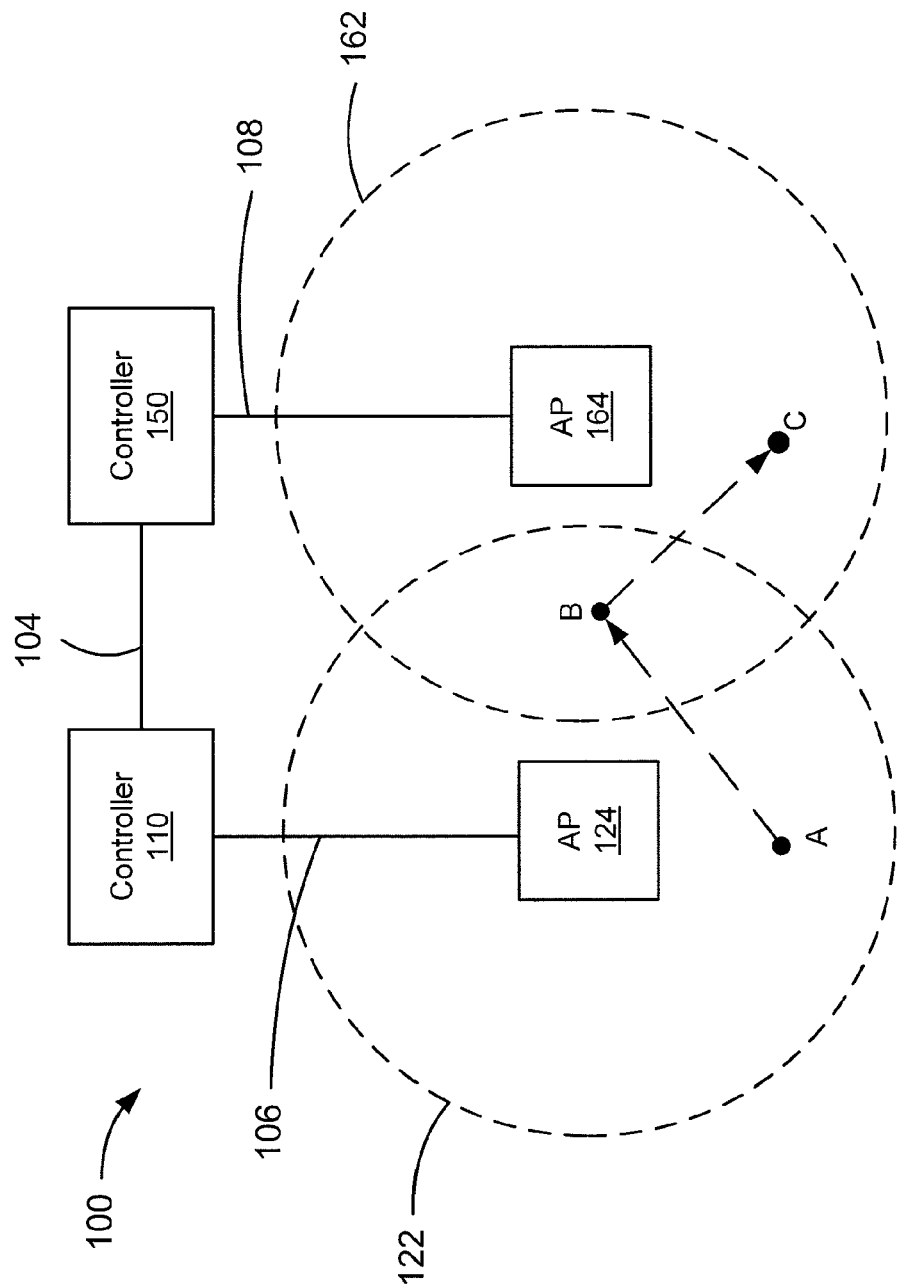
FIG. 4 is a schematic illustration of a portion of the wireless network of FIG. 1, according to an embodiment.

FIG. 4 illustrates a portion of the network 100 to further describe an example of the continuous connectivity of a communication device as it roams between control domain 112 and control domain 152 within network 100 between points A, B and C. As shown in FIG. 4, when a communication device (not shown) is at a first location within the network 100 at point A, the communication device can be connected to the network 100 via an access point 124. As the communication device moves or roams from the first location (point A) within a RF range 122 of access point 124 to a second location within the network 100 at point B within a RF range 162 of an access point 164, the access point 164 can detect the communication device (based on the beacon signal and response discussed above) and request the session key for that communication device from the second controller 150, as previously described. At point B, however, the communication device may still be connected to the network via the access point 124. The communication device can determine when the connection to the network 100 is to be changed from access point 124 to access point 164 based on the signal strength measured from access point 124 and the signal strength measured from access point 164 at the communication device. For example, as the signal strength to access point 164 becomes greater than the signal strength to access point 124 (e.g., as communication device moves from the second location at point B towards a third location at point C within the RF range 162), the communication device can request connection via access point 164. Because the access point 164 already received the session key for the communication device (e.g., when the communication device initially entered the RF range 162 of access point 164), access point 164 can connect and register the communication device to the network 100 without losing connectivity during the hand-over. The communication device will eventually drop its connection via access point 124, for example, simultaneously with the connection via access point 164, or after the connection via access point 164.

In the above example, the first controller 110 can eventually delete the session key for the communication device after the communication device has roamed out of the first control domain 112 and into the second control domain 152. For example, in some embodiments, the first controller 110 can delete the session key for the communication device after a preset time period (e.g., a day, a number of hours) in which the communication device has not been detected by any of the access points 124 within the first control domain 112. For example, in such an embodiment, the access points 124 can each send a signal to the controller 110 to indicate when the communication device is no longer within the RF range of that access point 124. Based on the signals from the access points 124, the first controller 110 can determine when the communication device was last connected to the network 100 via an access point 124. The first controller 110 can then wait a preset time period before deleting the session key for the communication device. In some embodiments, the first controller 110 can send a signal to each access point 124 instructing the access points 124 to also delete the session key for the communication device.

Similarly, in the above example, as the communication device roams within the second control domain 152, the second controller 150 can distribute the session key for the communication device to all the access points 164 in the second control domain 152. For example, in some embodiments, the second controller 150 can distribute the session key for the communication device to all the access points 164 after receiving a request for the session key for the communication from a threshold number of access points 164 (e.g., as the communication device roams within RF range of a threshold number of access points 164). In some embodiments, the second controller 150 can distribute the session key for the communication device to all the access points 164 upon receipt of a signal from the first controller 110 indicating that the first controller 110 is deleting the session key for the communication device.

Figure 5:
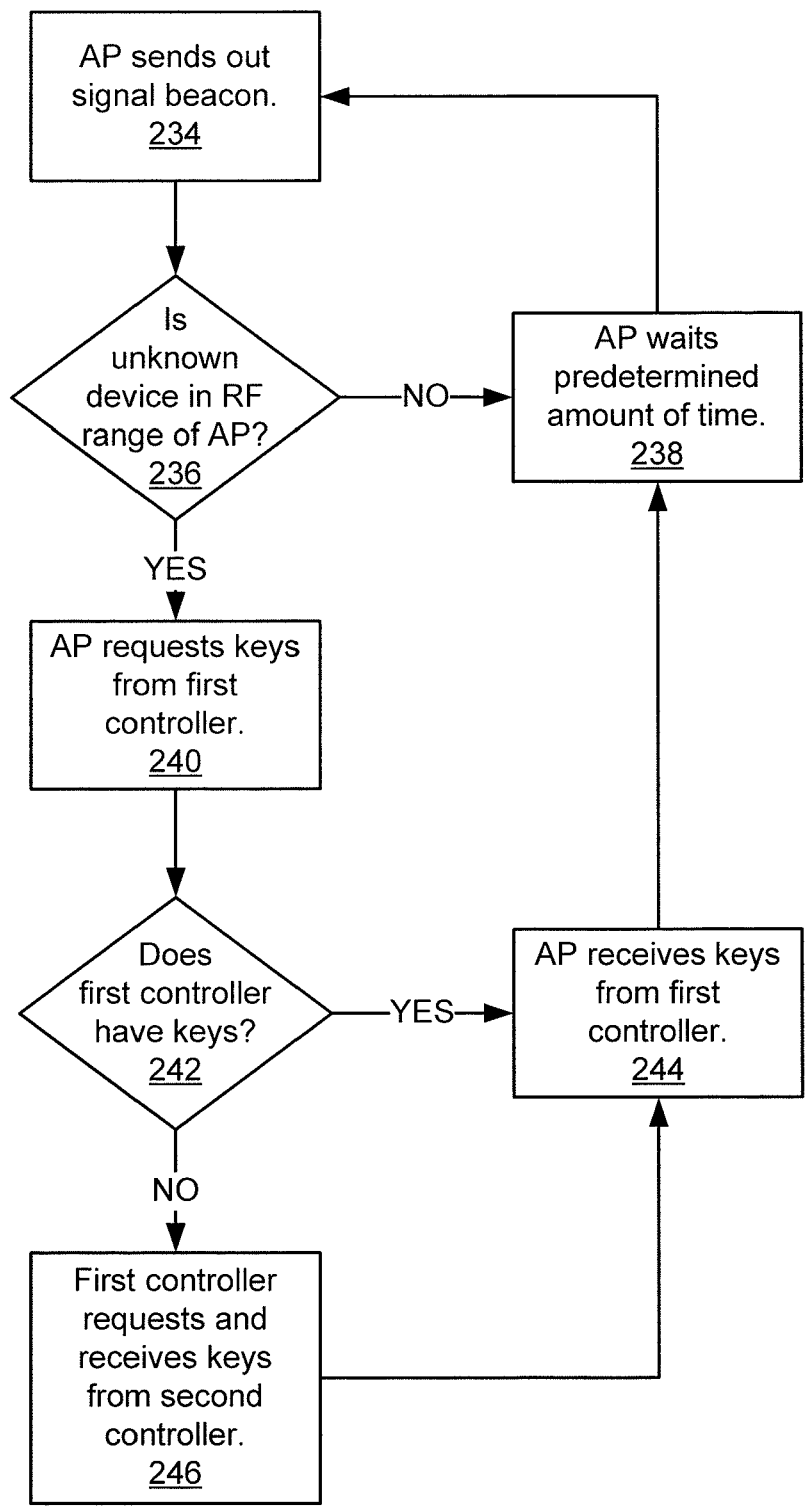
FIG. 5 is a flowchart illustrating a method of providing seamless roaming within a wireless network, according to an embodiment.

As described above, the access points 124, 164 can detect when a communication device is within a RF visibility range of that access device 124, 164. FIG. 5 is a flowchart illustrating a method of identifying a communication device within a RF range of an access point, according to an embodiment. At 234, an access point (e.g., access point 124, 164) can send out a periodic a beacon signal within its RF visibility range. For example, the access point can broadcast an identification packet within its RF range. At 236, based on a response to the beacon signal, the access device can determine if any unknown devices are within RF range of the access device. For example, in some embodiments, in response to the broadcast of the identification packet, the access point can receive a signal(s) having a unique identifier of a communication device(s) within its RF range. The access device can determine if any of the unique identifiers are unknown to the access device (e.g., the access point does not currently have the session key for that device). If no unknown devices are detected, at 238, the access point can wait a predetermined time period before sending another beacon signal. For example, in one embodiment, the access point can send out 10 signal burst every second (i.e., every $\frac{1}{10}^{th}$ of a second).

If an unknown device is detected, at 240, the access device can request the session key for that device from a first controller associated with that access device, as described above. At 242, the first controller can determine if it has the requested session key. If the first controller has the session key for that device, at 244, the session key is provided to the access point. If the first controller does not have the session key, at 246, the first controller can request and receive the session key from a second controller as described above, and can provide the session key to the access point at 244.

Figure 6:
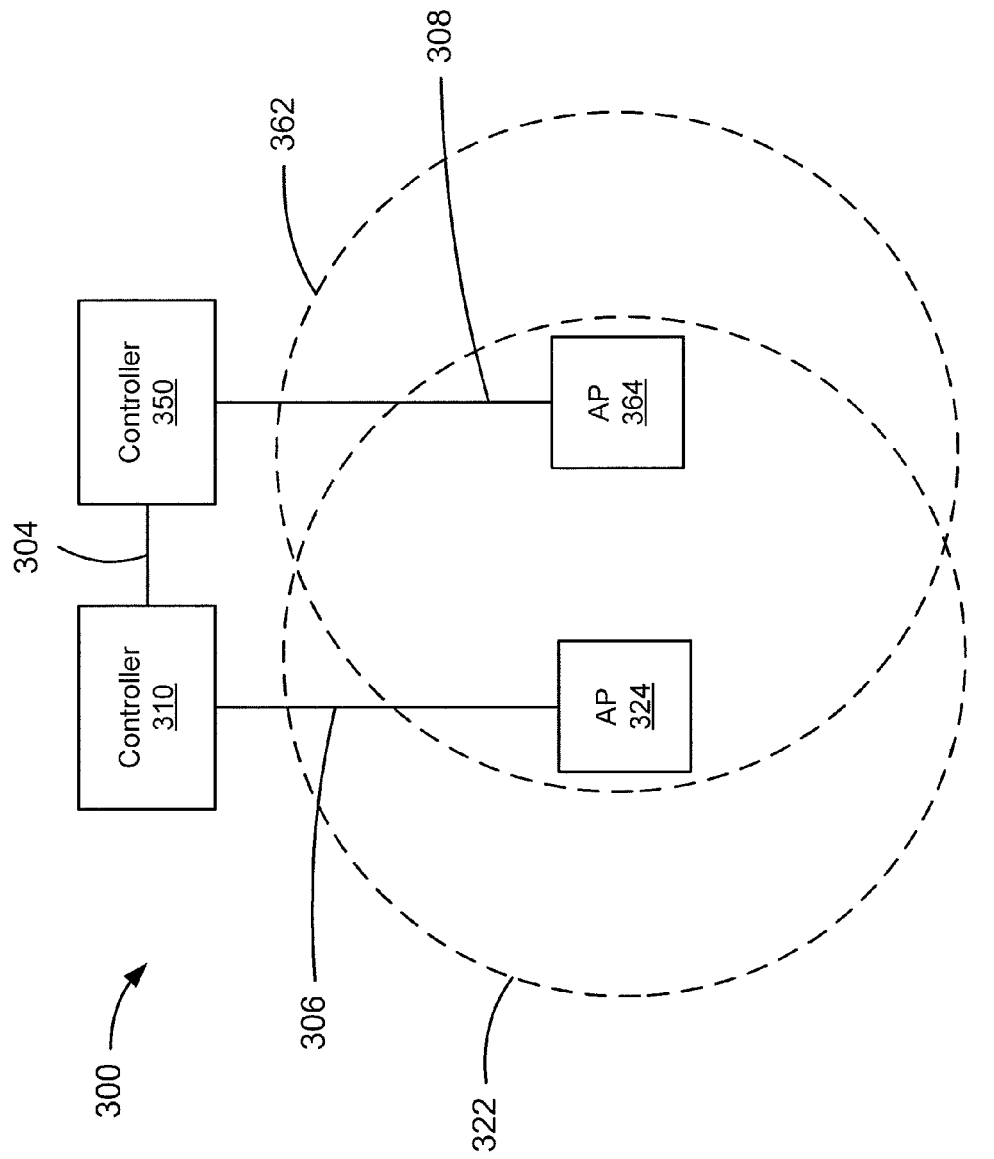
FIG. 6 is a schematic illustration of a portion of a wireless network, according to another embodiment.

FIG. 6 is a schematic illustration of a portion of a wireless network according to another embodiment. FIG. 6 illustrates a configuration of a network in which an access point from one control domain is located within an RF range of another access point of a different control domain. A wireless network 300 (also referred to as "network") includes a first controller 310 that can control and manage multiple access points 324 (only one shown in FIG. 6) within a first control domain (not shown in FIG. 6), and a second controller 350 that can control and manage multiple access points 364 within a second control domain (not shown in FIG. 6). The first controller 310 can be operatively coupled to the second controller 350 via a wired connection 304. The controllers 310, 350 can each be configured the same as or similar to the controllers 110, 150 described above and are therefore, not described in detail with respect to this embodiment. The network 300 can be, for example, a wireless local area network ("WLAN"), a wireless wide area network ("WWAN"), a cellular network and/or a network based on IEEE 802.11 standards. The network 300 can include any number of controllers and access points as described above for network 100.

Access point 324 includes a RF transceiver (not shown in FIG. 6) that defines a RF range 322 for access point 324, and access point 364 includes a RF transceiver (not shown in FIG. 6) that defines a RF range 362 for access point 364. Access point 324 and access point 364 can each provide access to the network 300 to multiple communication devices (not shown in FIG. 6) as described above for previous embodiments. Access point 324 and access point 364 can each detect when a communication device has entered into its RF visibility range. For example, in some embodiments, access points 324, 364 can identify a communication device by receiving a unique identifier from the device sent to the access point 324, 364 in response to the access point 324, 364 broadcasting an identifier packet as previously described.

As shown in FIG. 6, the access point 324 is located within the RF range 362 of the access point 364, and the access point 364 is located within the RF range 322 of the access point 324. In such a configuration, the access point 324 can detect the presence of the access point 364 and access point 364 can detect the presence of access point 324. For example, when access point 324 broadcasts an identifier packet as described above, the access point 324 can detect a response representing a unique identifier associated with access point 364. Similarly, when access point 364 broadcasts an identifier packet as described above, it can detect a response representing a unique identifier associated with access point 324. When access point 324 identifies access point 364, access point 324 can request all the session keys associated with access point 364. For example, access point 324 can request the session keys associated with access point 364 from first controller 310. If first controller 310 does not have the session keys for access point 364, first controller 310 can request the session keys from second controller 350. After receiving the session keys form the second controller 350, first controller 310 can then provide the session keys to access point 324. Similarly, when access point 364 identifies access point 324, access point 364 can request all the session keys associated with access point 324. For example, access point 364 can request the session keys associated with access point 324 from second controller 350. If second controller 350 does not have the session keys for access point 324, second controller 350 can request the session keys from first controller 310. After receiving the session keys from the first controller 310, second controller 350 can then provide the session keys to the access point 364.

With the access point 324 having all the session keys associated with access point 364, and access point 364 having all the session keys associated with access point 324, as a communication device roams within the RF range 322 of access point 324 and the RF range 362 of access point 364, the communication device can maintain connectivity to the network via either access point 324 or access point 364. As described above, the communication device can change its connectivity through either access point 324 or access point 364 based on the strength of the RF signal between the access point 324, 364 and the communication device.

Figure 7:
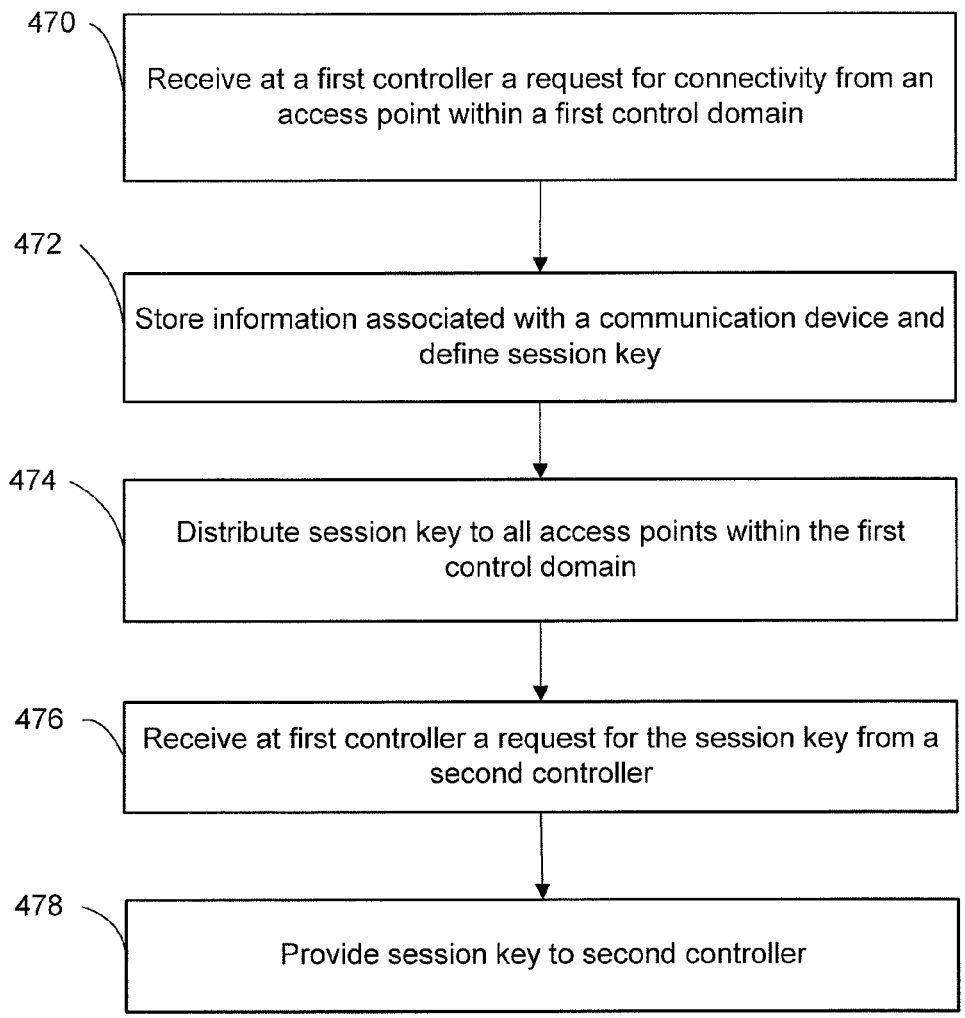
FIG. 7 is a flowchart illustrating a method of registering and providing connectivity of a communication device to a wireless network, according to an embodiment.

FIG. 7 is a flowchart illustrating a method of registering and connecting a communication device to a wireless network, according to an embodiment. At 470, connectivity information associated with a communication device (e.g., information for connecting to a network via an access point within a first control domain of the network) can be received at a first controller. The first controller can be configured to control and manage multiple access points within the first control domain as described herein. At 472, the first controller can store the information associated with the communication device, such as, for example, a unique identifier, authentication keys, state information and/or security policies, and define a session key for that communication device. At 474, the first controller can distribute the session key for that communication device to all the access points within the first control domain. At 476, the first controller can receive a request from a second controller within the wireless network for a session key associated with the communication device. For example, as previously described, the second controller can be configured to control and manage multiple access points within a second control domain of the wireless network, and as the communication device roams within a RF range of one of the access points of the second control domain, the access point can request the session key for the communication device. At 478, the first controller can provide the session key to the second controller, which in turn can provide the session key to the second access point.

In an alternative embodiment, a controller of a wireless network can distribute session keys to access points within its associated control domain only upon request by an access point, rather than distributing the session key to all access points within the control domain. For example, a wireless network can include one or more control domains, one or more controllers, each controlling and managing multiple access points within a different control domain of the wireless network, as described herein. When a communication device is initially registered to the wireless network via a first access point of a first control domain associated with a first controller, the first controller can define a session key for that communication device as previously described. The first controller can then provide the session key to only that first access point, rather than distributing the session key to all access points within the first control domain. As the communication device roams within a RF range of a second access point within the first control domain, the second access point can request the session key for that communication device from the first controller. In such an embodiment, an access point of the first control domain can delete the session key for the communication device, for example, after a preset time period in which the communication device has roamed outside of that access point's RF range. In some embodiments, an access point of the first control domain can delete the session key for the communication device after receiving a signal from the first controller as previously described.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc—Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the systems, apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a first access point within a wireless network, the first access point configured to identify a communication device within a radio communications area of the first access point, the first access point configured to request a session key associated with the communication device from a first network controller associated with the first access point in response to the communication device being identified, the first access point configured to receive the session key associated with the communication device from a second network controller associated with a second access point having a radio communications area partially overlapping the radio communications area of the first access point.

2. The apparatus of claim 1, wherein the first access point is configured to receive the session key associated with the device from the second network controller via the first network controller.

3. The apparatus of claim 1, wherein the first access point is configured to receive the session key associated with the communication device from the second network controller via the first network controller over a wired network connection.

4. The apparatus of claim 1, wherein the first access point is an access point within a wireless local area network.

5. The apparatus of claim 1, wherein the first access point is configured to identify the communication device by receiving a unique identifier from the device sent to the first access point in response to the first access point broadcasting an identifier packet.

6. The apparatus of claim 1, wherein the first access point is configured to request the session key associated with the communication device within a time period within which the second access point connects the communication device to a network.

7. The apparatus of claim 1, wherein the first access point is configured to request the session key associated with the device when the device is at a first location and connected by the second access point to a network, the first access point is configured to connect the communication device to the network when the device is at a second location.

8. A non-transitory processor-readable medium storing code representing instructions to cause a processor to:
broadcast an identification packet within a radio communications area of a first access point of a network;
receive, in response to the broadcast of the identification packet, a signal having a unique identifier of a device;
request, in response to the signal, a session key associated with the device from a first network controller associated with the first access point; and
receive the session key from a second network controller via the first network controller, the second network controller associated with a second access point that connects the device to the network when the device is within a radio communications area of the second access point.

9. The non-transitory processor-readable medium of claim 8, wherein the second access point connects the device to the network when the device is at a first location, the first access point connecting the device to the network when the device is at a second location different from the first location.

10. The non-transitory processor-readable medium of claim 8, wherein the first access point is configured to use the session key to maintain a network session between the device and the network.

11. The non-transitory processor-readable medium of claim 8, wherein the network is a wireless local area network.

12. The non-transitory processor-readable medium of claim 8, wherein the first network controller manages the first access point.

13. The non-transitory processor-readable medium of claim 8, wherein the code representing instructions to cause the processor to broadcast the identification packet includes code to periodically broadcast the identification packet such that each device within the radio communications area of the first access point responds to the identification packet.

14. The non-transitory processor-readable medium of claim 8, wherein the device is a first device, the signal is a first signal, the session key is a first session key, the non-transitory processor-readable medium further comprising code representing instructions to cause the processor to:
receive, in response to broadcast of the identification packet, a second signal having a unique identifier of a second device; and
retain a session key associated with the second device based on the second signal.

15. A system, comprising:
a first network controller configured to manage a first access point within a network, the first network controller configured to maintain a session key for a device such that the first access point provides the device with connectivity to the network when the device is at a first location and a second location, the first location being within a radio communications area of the first access point but not a second access point; and
a second network controller configured to manage the second access point within the network, the second network controller configured to request, from the first network controller, the session key for the device in response to the device moving from the first location to the second location within the radio communications area of the first access point, the second location being within a radio communications area of the second access point.

16. The system of claim 15, wherein the second access point is configured to send a broadcast signal to the device such that the device responds to the broadcast signal when the device is at the second location.

17. The system of claim 15, wherein the second access point is configured to provide the device with connectivity to the network when the device is at a third location such that the third location is within the radio communications area of the second access point but not within the radio communications area of the first access point such that connectivity to the network is maintained as the device moves from the first location to the third location.

18. The system of claim 15, wherein the second network controller is configured to receive the session key from the first network controller, the second network controller configured to cache the session key when the device is at the second location, the second network controller configured to activate the session key when the device is at a third location.

19. The system of claim 15, wherein the network is a wireless local area network.

20. The system of claim 15, wherein the second network controller is configured to request the session key from the first network controller in response to the second access point identifying the device within the radio communications area of the second access point.

* * * * *